Jan. 14, 1941.     H. V. JAMES     2,228,316
TIRE RECAPPING MACHINE
Filed June 27, 1938     2 Sheets-Sheet 1

INVENTOR.
HAROLD V. JAMES.
BY
ATTORNEY.

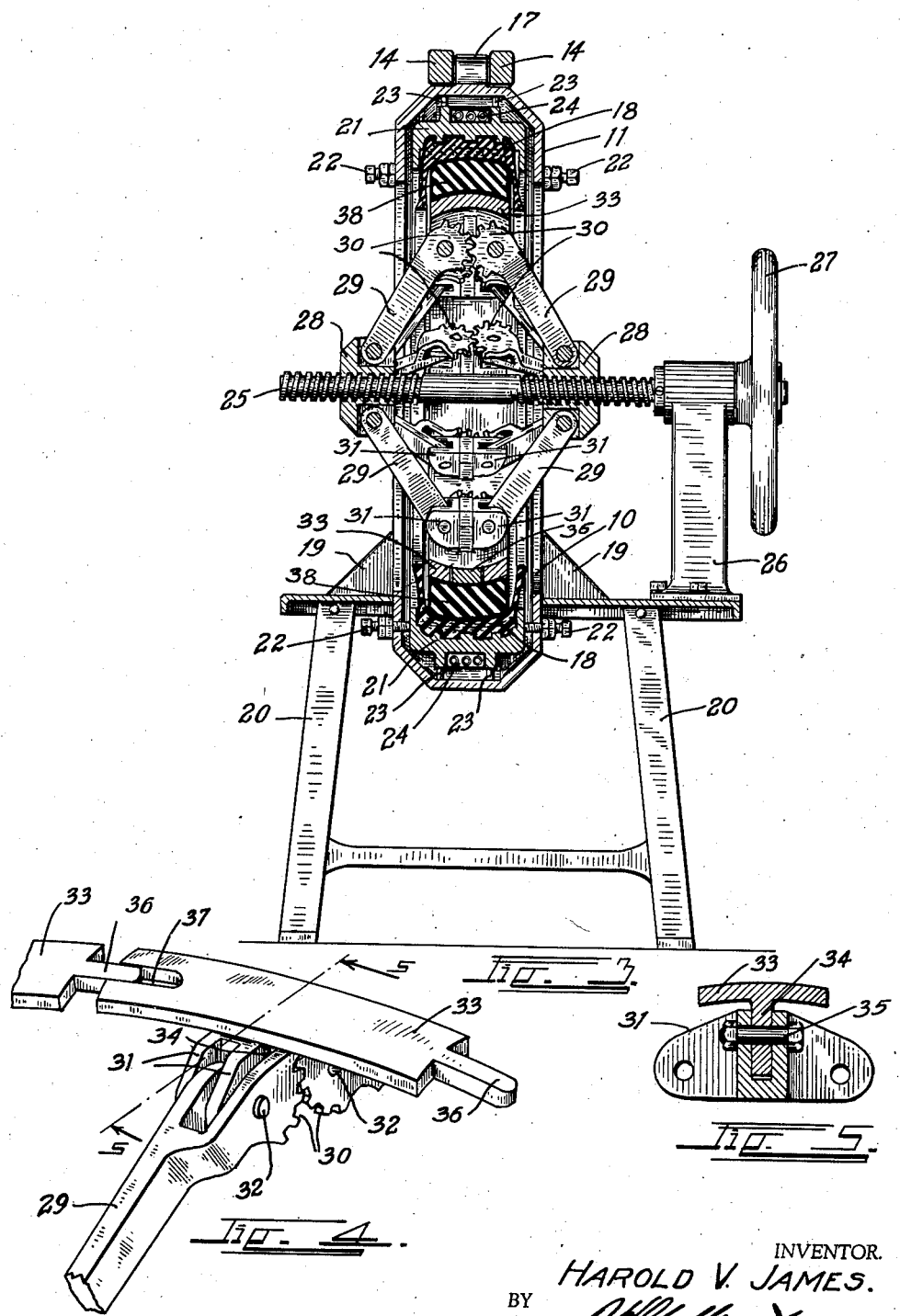

Patented Jan. 14, 1941

2,228,316

UNITED STATES PATENT OFFICE 2,228,316

TIRE RECAPPING MACHINE

Harold V. James, Denver, Colo.

Application June 27, 1938, Serial No. 216,033

3 Claims. (Cl. 18—18)

This invention relates to a tire recapping machine and has for its principal object the provision of a highly efficient device by means of which a complete new traction surface and tread design may be placed upon worn tire casings and in which the entire renewed circumference will be cured evenly, uniformly, and simultaneously.

Another object of the invention is to provide an efficient means for obtaining a uniform, outward, radial pressure against the casing without the use of air bags or similar devices.

Other objects are: to provide a machine of this character in which various types and sizes of molds may be quickly and easily interchanged; to provide means for allowing the mold to be tightly closed upon the rebuilt tread stock; and to provide means for insulating the heated mold to reduce the heat of the outer housing of the machine.

Other objects and advantages reside in the detail construction of the invention, which is designed for simplicity, economy, and efficiency. These will become more apparent from the following description.

In the following detailed description of the invention reference is had to the accompanying drawings which forms a part hereof. Like numerals refer to like parts in all views of the drawings and throughout the description.

In the drawings:

Fig. 3 is a vertical section taken on the line 3—3, Fig. 1.

Fig. 4 is a detail perspective view illustrating the toggle link construction.

Fig. 5 is a detail section through one of the inner pressure plates taken on the line 5—5, Fig. 4.

Figure 1:
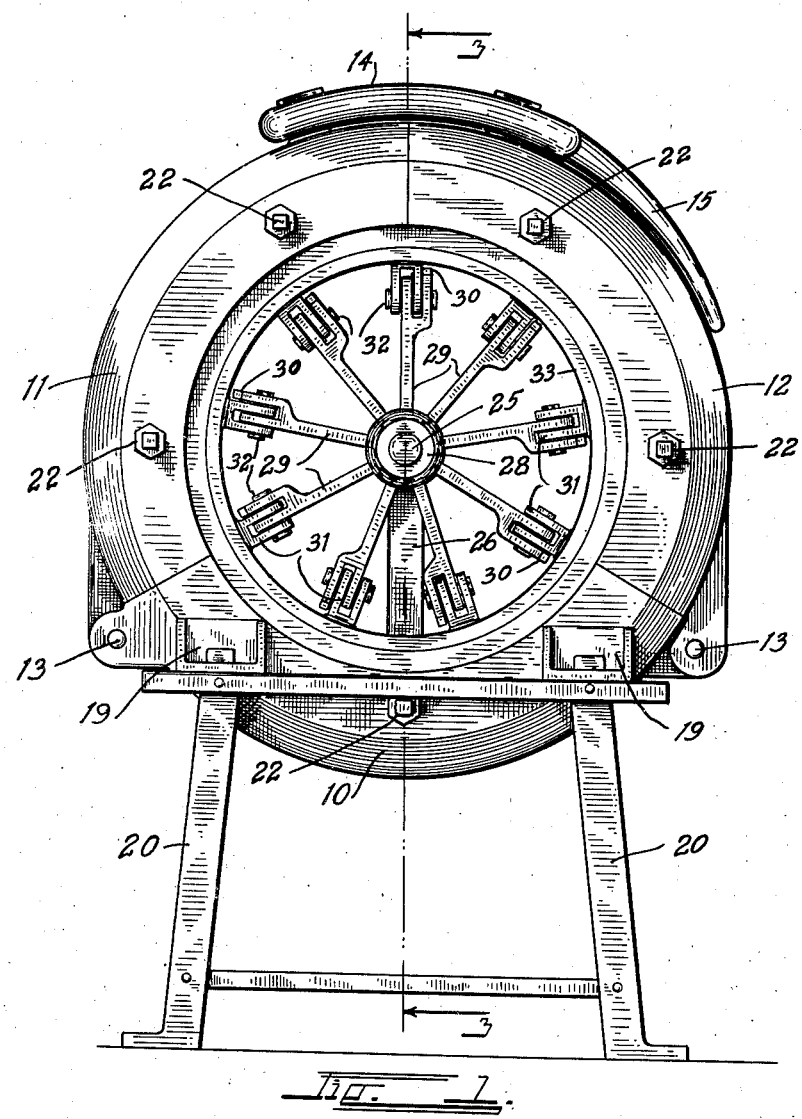
Fig. 1 is a side view of the complete retreading device.

This recapping device is intended for use in renewing the traction surface of worn tire casings and is to be used on casings on which the original design has worn away until traction efficiency and shock resistance have been reduced. It is not intended for use on casings in which the cords or fabric are exposed but only for producing a perfect union between the old tread remaining and the renewed cap thereon.

In using the improved capping device, the old tread is sufficiently cleaned and buffed to provide a perfect adhesion surface and is then built up with the new rubber. The casing with its raw rubber tread is then placed in this improved recapping machine which molds the new traction design thereon and cures the new tread to the remainder of the old tread on the casing.

The retreading device employs an outer housing formed of three sector-shaped, channel sections, a stationary section 10, and two hinged sections 11 and 12. The hinged sections 11 and 12 are mounted upon hinge pins 13 at each extremity of the section 10 and may be clamped together at the top of the machine by means of a clamping link 14 and clamping lever 15.

The lever 15 is rotatably mounted at one extremity of the link 14 and engages an integral boss 16 formed on the section 12. The link 14 engages a similar boss 17 formed on the section 11.

Figure 2:
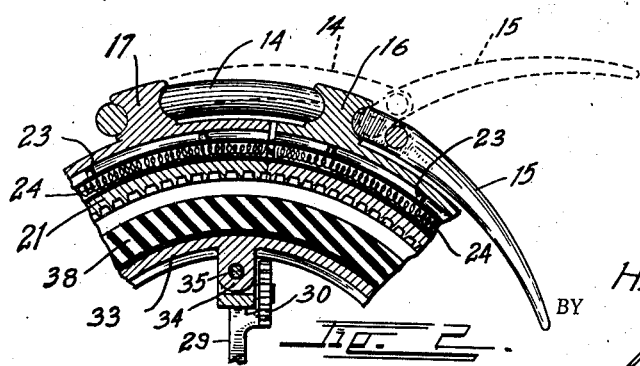
Fig. 2 is a detail section through the upper portion thereof illustrating the locking link.

When the two sections are initially brought together around the tire casing which is indicated on the drawing at 18, the link and lever are in the broken line position of Fig. 2. By forcing the lever downwardly to the solid line position, the two sections are drawn and locked tightly together. The fixed section 10 is formed with cast feet 19 which rest upon, and are secured to, any suitable supporting stand or frame 20.

The housing contains an annular series of tread molds 21 which are clamped in place in the housing by set screws 22 and which are spaced from the periphery of the housing upon spacing pegs 23.

This construction allows an insulating air jacket to completely surround the molds and maintain them separated from and heat insulated from the housing. The series of tread molds 21 is surrounded by an arcuate electrical heating element 24 which is embedded in a peripheral channel around the entire series of molds.

The tire casing is forced radially outward into the molds 21 by means of a horizontal jack screw 25 which is supported concentrically of the housing in a suitable bearing bracket 26 extending from the supporting frame 20. The jack screw is provided with a hand wheel 27 by means of which it may be rotated and it is threaded at opposite sides of the housing with threads of opposite hand. A nut member 28 rides on each set of threads on the screw 25.

It can be seen that as the screw is rotated one direction, the nut members 28 will approach each other and when rotated in the other direction they will separate from each other.

A series of toggle links 29 extend radially outward from each of the nut members 28. The opposite links 29, from each nut member, are in mesh with each other to form pairs, through the medium of gear segments 30 carried thereon, so that the two links of each pair must expand uniformly. The outer extremities of each pair of links 29 are pivoted in a cross head 31 upon suitable hinge pins 32 which act to maintain the gear segments in mesh.

A pressure shoe 33 is mounted upon each cross head 31. Each pressure shoe 33 is formed with a lug 34 which extends into a bifurcation in the cross head 31 and is pivoted therein upon a pivot bolt 35. One extremity of each pressure shoe is formed with an interlocking tongue 36. The other extremity of each shoe is formed with a lip joint 37 to receive the tongue 36 of the adjacent shoe. This lip joint and tongue arrangement forms the entire series of shoes into a continuous annular band which acts against a cushion ring 38 to force the tire radially outward against the annular series of molds 21. The cushion ring 38 is simply a relatively heavy circular pad of resilient rubber which forms a peripheral tire around the entire series of pressure shoes.

It can be seen that when the hand wheel is rotated in one direction, the nut members 28 will be brought together to force the pressure shoes 33 uniformly outward in all directions against the tire casing so that the latter is forced into uniform contact with the molds at all points.

To remove the retreaded casing, it is only necessary to reverse the hand wheel so as to draw the pressure shoes radially inward; release the locking link 14 to open the housing and thence slip the casing and cushion ring from the shoes. The cushion ring can then be removed from the casing.

It will be noted that the original adhesion between the tread rubber and the cords is not disturbed. Heat is applied only to the new stock with the exception of a small amount which is radiated to the side wall by retaining flanges 39, which extends along each side of the molds 21 to hold the new rubber in confinement thereon.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. Means for uniformly expanding a tire casing within an annular recapping mold, comprising: an annular series of arcuate pressure shoes; a tongue on each shoe extending into a lip joint in an adjacent shoe to maintain the shoes in alignment; a cross head within each pressure shoe, said cross heads lying transversely of said shoes and being pivotally secured thereto so as to allow the shoes to rock in a plane at right angles to the axis of said series; a jack screw having oppositely threaded extremities; means for rotatively supporting said screw axially through said series of shoes; a nut on each extremity of said screw on opposite sides of the plane of said series; toggle arms extending from each nut to the opposite extremities of said cross heads; and means for causing said arms to expand in unison as said shaft is rotated.

2. Means for uniformly expanding a tire casing within an annular recapping mold, comprising: an annular series of arcuate pressure shoes; a tongue on each shoe extending into a lip joint in an adjacent shoe to maintain the shoes in alignment; a lug extending radially inward from each pressure shoe and lying in a plane at right angles to the axis of the annular series; a cross head within each pressure shoe, said cross heads lying transversely of said shoes and being provided with channels for the reception of said lugs; a pivot member securing each lug in its channel so as to allow the shoes to rock in a plane at right angles to the axis of said series; a jack screw having oppositely threaded extremities; means for rotatively supporting said screw axially through said series of shoes; a nut on each extremity of said screw on opposite sides of the plane of said series; toggle arms extending from each nut to the opposite extremities of said cross heads; and means for causing said arms to expand in unison as said shaft is rotated; and a solid expansible rubber ring member surrounding said series of shoes to be expanded thereby.

3. Means for uniformly expanding a tire casing within an annular recapping mold, comprising: an annular series of arcuate pressure shoes; a tongue on each shoe extending into a lip joint in an adjacent shoe to maintain the shoes in alignment; a lug extending radially inward from each pressure shoe; a cross head within each pressure shoe, said cross heads lying transversely of said shoes and being pivoted on said lugs so as to allow the shoes to rock in a plane at right angles to the axis of said series; a jack screw having oppositely threaded extremities; means for rotatively supporting said screw axially through said series of shoes; a nut on each extremity of said screw on opposite sides of the plane of said series; toggle arms extending from each nut to the opposite extremities of said cross heads; a toothed sector on each arm, the sectors of the adjacent arms on each cross head being intermeshed to cause them to turn in unison.

HAROLD V. JAMES.